(12) United States Patent
Tägtström et al.

(10) Patent No.: US 6,447,219 B1
(45) Date of Patent: Sep. 10, 2002

(54) CUTTING INSERT FOR GROOVING

(75) Inventors: Pär Tägtström, Sandviken; Per Hansson; Claes Andersson, both of Gävle, all of (SE)

(73) Assignee: Sandvik Aktiebolag, Sandviken (SE)

( * ) Notice: Subject to any disclaimer, the term of this patent is extended or adjusted under 35 U.S.C. 154(b) by 28 days.

(21) Appl. No.: 09/664,552

(22) Filed: Sep. 18, 2000

(30) Foreign Application Priority Data

Sep. 16, 1999 (SE) .................................................. 9903302

(51) Int. Cl.$^7$ ................................................ B23B 27/04
(52) U.S. Cl. ........................ 407/117; 407/110; 407/114
(58) Field of Search .................................. 407/117, 118, 407/119, 120, 110, 113, 114, 115, 116

(56) References Cited

U.S. PATENT DOCUMENTS

| | | | |
|---|---|---|---|
| 4,778,311 A | | 10/1988 | Niemi |
| 4,992,007 A | * | 2/1991 | Saran ........................ 407/110 |
| 4,992,008 A | | 2/1991 | Pano |
| 5,137,396 A | * | 8/1992 | Durschinger ................ 407/117 |
| 5,423,639 A | | 6/1995 | Wiman |
| 5,443,334 A | * | 8/1995 | Pantzar ....................... 407/113 |
| 5,135,336 A | | 8/1997 | Noguchi et al. |
| 6,086,291 A | | 7/2000 | Hansson et al. |
| 6,099,209 A | * | 8/2000 | Murray et al. ................. 407/1 |
| 6,196,770 B1 | * | 3/2001 | Atrom et al. ................. 407/40 |

* cited by examiner

Primary Examiner—Henry Tsai
(74) Attorney, Agent, or Firm—Burns, Doane, Swecker & Mathis, LLP

(57) ABSTRACT

A cutting insert for grooving operations includes a central shank portion and a forward cutting head. The cutting head includes a front clearance surface having a main cutting edge at an upper end thereof. The clearance surface is non-planar. Rather, the clearance surface exhibits a curvature in order to strengthen the main cutting edge.

13 Claims, 2 Drawing Sheets

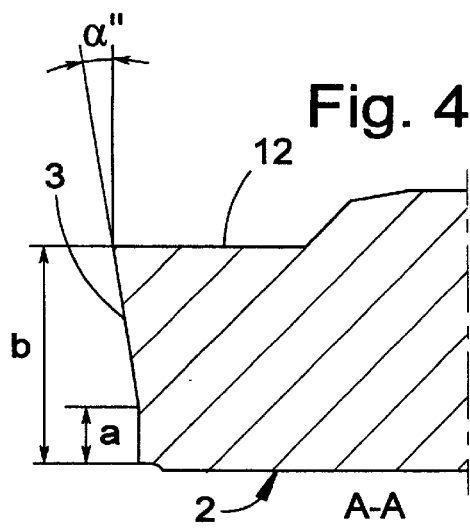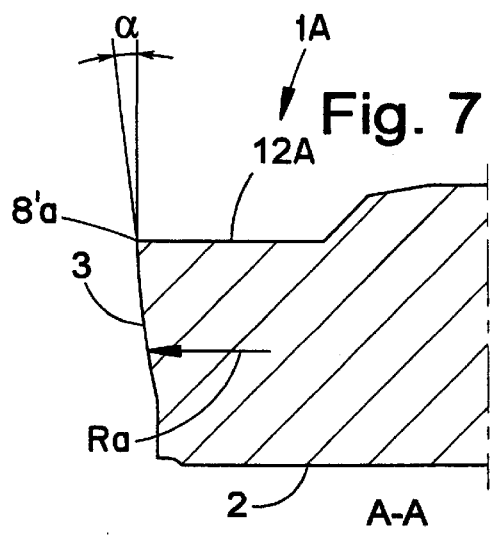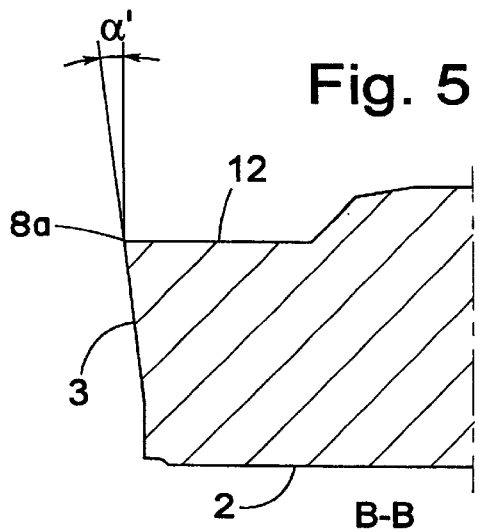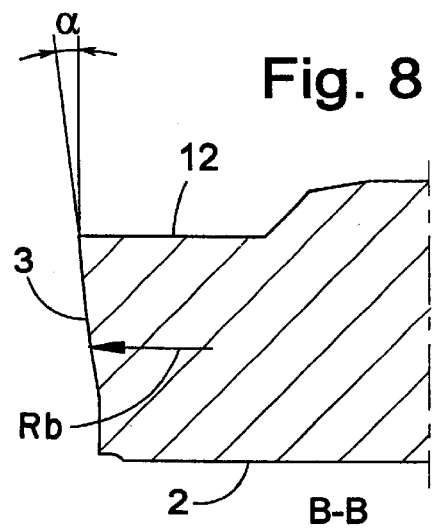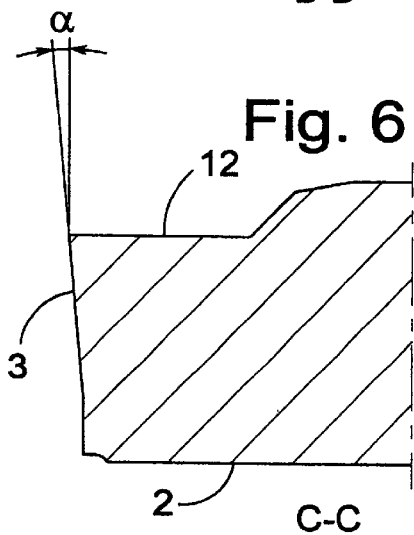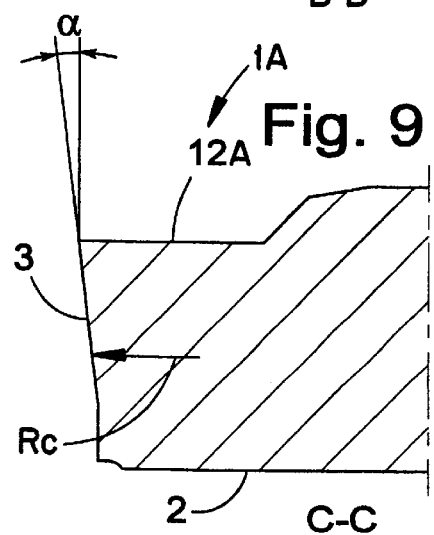

CUTTING INSERT FOR GROOVING

BACKGROUND OF THE INVENTION

The present invention relates to a cutting insert for grooving operations. In particular the present cutting insert according to the invention is suitable for radial grooving, although it also can be used for various axial grooving operations, as well as for axial and radial longitudinal turning operations.

During such machining operations, chip breaking and chip formation are often of decisive importance for undisturbed production. Modern high productive machines put very high priority on good chip transport. Long uncontrollable chips can easily cause machine interruptions and cessation. Chip control must therefore be given large attention and governs, to a high degree, the tool design.

Cutting inserts intended for grooving operations and parting off are usually clamped in a holder, which is blade shaped in order to be useful in the slot being produced. The expression "holder of blade type" is also intended to comprise slot mills. Such cutting inserts are, for example, known from U.S. Pat. Nos. 4,778,311, 4,992,008, 5,135,336 and 5,423,639. At the same time there is nowadays a demand if possible to be able to obtain improved surface finish of the surfaces in the slots produced.

OBJECTS AND SUMMARY OF THE INVENTION

A first purpose of the invention is to produce a cutting insert, which is well suited to give an improved and stronger cutting edge.

It is another purpose of the invention to produce a cutting insert, which is well suited for repeated radial grooving.

It is a third purpose to produce a cutting insert, which enables a good axial stop to be achieved in combination with high feed.

It is a fourth purpose with the present invention to produce a cutting insert, which also can be used for longitudinal turning.

The present invention involves a cutting insert which comprises a longitudinally elongated body having an upper face, a lower face, two side faces, and an end face disposed at a longitudinal end of the body. An upper edge of the end face forms a main cutting edge. A portion of the end face extending downwardly from the main cutting edge defines a clearance surface. Two side edges extend from respective ends of the main cutting edge. The clearance surface is of non-planar configuration, having a curvature which varies from one end of the main cutting edge to the other end thereof. A curved corner cutting edge extends between an end of the main cutting edge and a secondary cutting edge defined by one of the side edges. The curved corner cutting edge includes a curved primary portion extending from the respective end of the main cutting edge and having a first radius, and a curved secondary portion extending from the primary portion and having a larger radius than the primary portion.

BRIEF DESCRIPTION OF THE DRAWINGS

For illustrating but non-limiting purpose, preferred embodiments of the invention will now be described in more detail under reference to the enclosed drawings, wherein:

FIG. 4 shows the same cutting insert as in FIG. 1, along longitudinal section plane A—A;

FIG. 5 shows an embodiment of the cutting insert as in FIG. 1 along the longitudinal section plane B—B;

FIG. 6 shows another embodiment of the cutting insert as in FIG. 1 along the longitudinal section plane C—C;

FIG. 7 is similar to FIG. 4 but shows another embodiment of the cutting insert;

FIG. 8 is similar to FIG. 5 but shows another embodiment of the cutting insert; and FIG. 9 is similar to FIG. 6 but shows another embodiment of the cutting insert.

DETAILED DESCRIPTION OF THE PREFERRED EMBODIMENTS OF THE INVENTION

Figure 1:
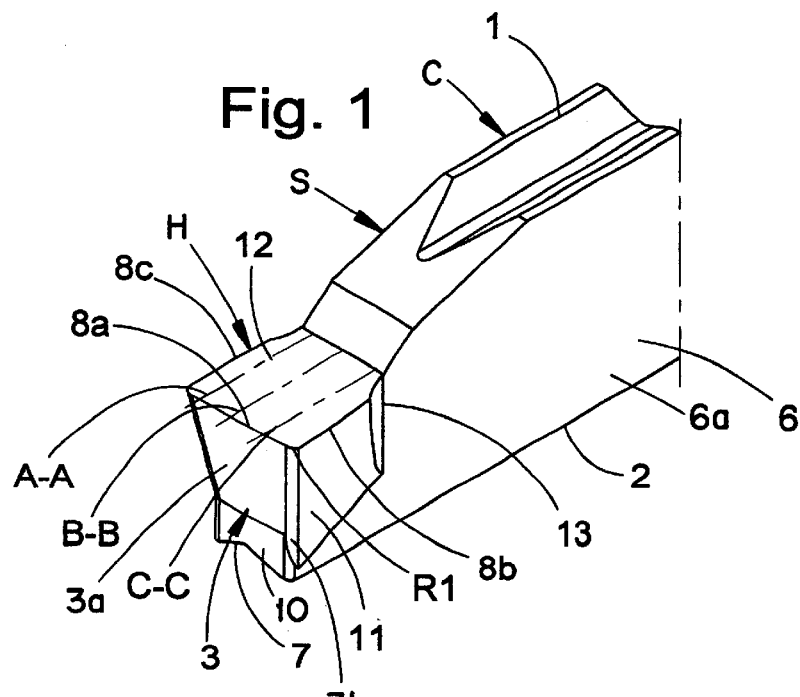
FIG. 1 shows a cutting insert according to the invention in a perspective view as seen obliquely from above.
Figure 2A:
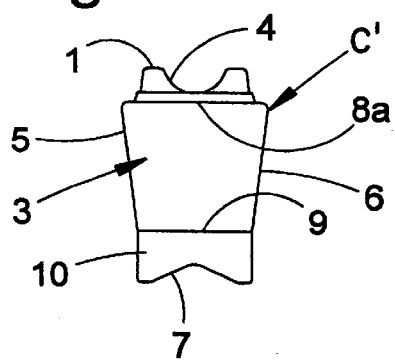
FIG. 2a shows a front elevational view of the insert of FIG. 1 without a bevel on the front end face thereof.
Figure 2B:
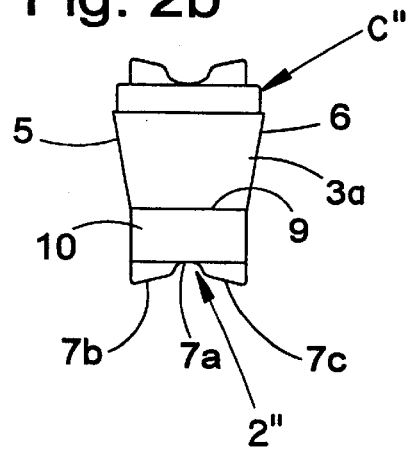
FIG. 2b shows an alternative embodiment of a cutting insert as seen in an elevational view from its forward end.
Figure 2C:
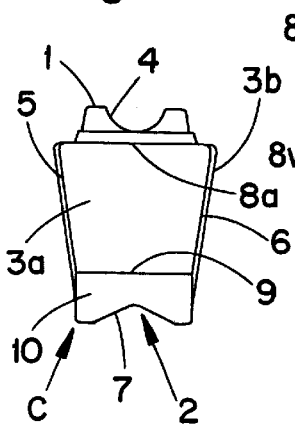
FIG. 2c shows a front elevational view of the insert of FIG. 1 with the first end face thereof being beveled.
Figure 3:
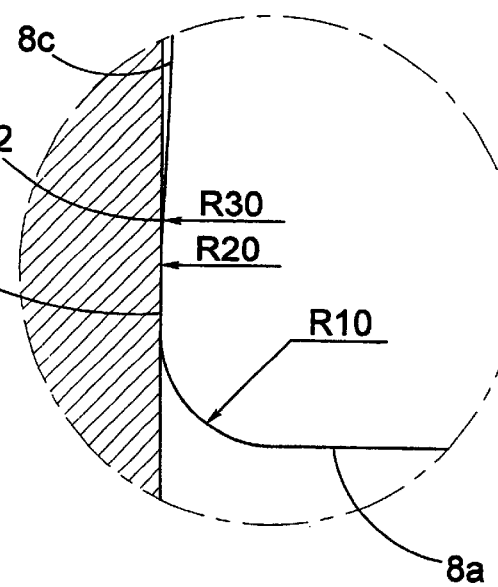
FIG. 3 shows an enlarged corner of the cutting insert depicted in FIG. 1.

FIG. 1–3 shows a cutting insert C for grooving according to the invention including a body of generally parallelepipedic shape on upper face 1, a bottom face 2, two side faces 5, 6, and two end faces 3. Only one end of the insert is shown in the drawings; the opposite end is preferably of identical configuration. The end face 3 comprises upper and lower portions 3a, 10 which define a front clearance surface and a stop surface, respectively. The insert C can be considered as comprised of a shank portion S and a cutting head H disposed at one, but preferably both, longitudinal ends of the shank (only one cutting head H being depicted). The portions 5a, 6a of the side faces 5, 6 that lie along the shank are planar and parallel. A portion 12 of the upper face 1 forms a top chip surface of the cutting head H, and portions 11 of the side faces 5, 6 form side clearance surfaces of the cutting head. The clearance surface 3a constitutes a front end surface of the cutting head.

Opposite sides of the clearance surface can be provided with bevels 3b. FIG. 2c shows a beveled clearance surface in elevation, whereas FIG. 2c shows a cutting insert C' having a non-beveled clearance surface.

As can be seen in FIGS. 2a and 2c, the width of the stop surface 10 is less than a maximum width of the insert. Also, as can be seen in FIG. 4, the stop surface 10 is offset longitudinally inwardly from the forward most portion of the insert (i.e., the portion defined by the cutting edge).

The cutting insert is generally made of coated or sometimes non-coated cemented carbide; the upper surface 1 and the bottom surface 2 are respectively shaped with longitudinally concave V-shaped keyways 4 and 7. The keyway 4 extends along the entire bottom surface whereas the keyway 4 does not extend along the top surface 12 of the cutting head. An alternative form of the cutting insert C" is shown according to FIG. 2b, where the bottom support surface 2" comprises a center concave slot 7a and two inclined faces 7b, 7c disposed on respective sides of the slot. The faces 7b, 7c are intended to support against corresponding inclined support surfaces in a blade holder in the way described in Hansson et al. U.S. Pat. No. 6,086,291, the disclosure of which is hereby incorporated by reference. An intersection of the main clearance surface 3a with the surface 12 forms a transverse main cutting edge 8a, which via cutting corner R1 extends to side edges 8b, 8c of the cutting head. This corner radius preferably composed of a number of radiuses R10, R20, R30 as shown in FIG. 3. The secondary radius R20 is substantially bigger than a primary radius R10 so as to provide a wiper edge 8W1 that extends rearwardly to a rear edge 8W2, the edge radius R30 of which is less than each of R10 and R20.

The clearance surface 3a intersects the stop surface 10 at a transverse break line 9 in a lower surface 10. The surface 10 extends perpendicularly to a longitudinal center line of the insert, i.e., perpendicularly to the bottom surface 2. This surface 10 is intended to act as an axial stop surface in a holder. The side clearance surfaces 11 are provided on insert portions which project laterally from the remainder of the cutting insert and via vertical break lines 13 extend into the side surfaces 5, 6. The top chip surface 12 extends inwards from the main cutting edge 8, and is formed with a chip former 14. This chipformer could be in the shape of a number of recesses with concave cross-section. Alternatively the chipformer could be such that it extends as a recess through the central portion of the main cutting edge 8a in its central portion and which rearwardly has increasing depth and then decreasing depth as is shown in Swedish Document No. 9801012-7 the disclosure of which is hereby incorporated by reference. The purpose hereof is to provide the surface 12 with a positive clearance angle of 5°–30° whilst plastically deforming the chip such that it becomes easier to break the same.

In accordance with the invention, the clearance surface 3a is provided with a clearance angle (α) whilst having a non-planar shape intended to provide the main cutting edge 8a with improved strength.

In one embodiment shown in FIGS. 4–6, the formation of said surface 3a is such that the clearance angle (α) as measured at a position close to one end of the main cutting edge 8 (section C—C) has a value (e.g., 5.18°) that is smaller than the size of a clearance angle ( ") measured at a portion (section A—A) close to the opposite end of same edge 8a (e.g., 8.85°), as well as being smaller than a clearance angle ' (e.g., 7.04°) located between those angles and ".
In this embodiment, a longitudinal plane (A, B, or C) intersects the clearance surface 3a along a straight line (see FIGS. 4–6), but the non-uniform clearance angle feature results in the clearance face being curved (non-planar) which results in a stronger main cutting edge.

In FIGS. 7–9, there is shown an alternative embodiment of an insert 1A wherein the clearance angle is constant, but the clearance surface 3a is cambered laterally with such curved variation that the curved radius Ra of said surface 3 close to one end of the main cutting edge is substantially smaller than the radius of curvature Rc close to the opposite end of that edge, as appears from a comparison of FIGS. 7 and 9. The radius Rc is also smaller than an intermediate radius Rb (see FIG. 8). As an example, the radii Ra, Rb, and Rc could be 16.2 mm, 27 mm, and 85.6 mm, respectively.

Preferably this cambering has been made in such manner that the size of the clearance angle (α) along the entire main cutting edge 8'a remains constant from one end to the opposite end of the cutting edge. In the illustrated example this angle amounts to 7°.

In the embodiment as shown in FIGS. 7–9, the radius of curvature Rc of said clearance surface 3a close to one end of the main cutting edge 8'a is 3–6 times larger than the size of said radius of curvature Rc in a longitudinal section taken close to the opposite end of said cutting edge 8'a. The appearance of the insert 1A in this regard is preferably selected such that the size of said radius of curvature Rc is about 5 times larger than the size of the radius Ra.

As regards dimensioning of the stop surface 10 in FIGS. 4–9 this ought to be made such that its height (a) is 30–70% of the total height (b) of the end face 3 (e.g., see FIG. 4). Preferably, the height (a) should amount to 35–55% of the height (b) (see FIG. 4).

In the embodiments according to FIGS. 4–9, the cutting edge 8a or 8'a is preferably perpendicular to the longitudinal planes A–C, but could be slightly non-perpendicular thereto, if desired.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutting insert comprising a longitudinally elongated body having a longitudinal length and a transverse width, the length being greater than the width, the body comprising a shank portion extending lengthwise and a cutting head portion disposed at one end of the shank portion, the shank portion defining an insert-mounting part of the insert, and the cutting head portion defining a cutting part of the insert; the body further including: an upper face, a lower face, and two side faces extending the length of the body, a portion of the upper face defining a top chip surface of the head portion, a portion of each of the side faces forming a side clearance surface of the head portion, an end face disposed at a longitudinal end of the body, an upper edge of the end face forming a main cutting edge extending transversely of the length, and a portion of the end face extending downwardly from the main cutting edge defining a clearance surface, there being two side edges extending generally in a direction along the length of the body away from respective ends of the main cutting edge, the clearance surface being of non-planar configuration, having a curvature which varies from one end of the main cutting edge to the other end thereof, there being a curved corner cutting edge extending between an end of the main cutting edge and a secondary cutting edge defined by one of the side edges, the curved corner cutting edge including a curved primary portion extending from the respective end of the main cutting edge and having a first radius, and a curved secondary portion extending from the primary portion and having a larger radius than the primary portion.

2. The cutting insert according to claim 1 wherein a clearance angle formed between an upper portion of the clearance surface and the main cutting edge is smaller adjacent one end of the main cutting edge than adjacent an opposite end thereof.

3. The cutting insert according to claim 1 wherein a longitudinal plane extending through both the upper and lower faces perpendicularly to the lower face intersects the clearance surface along a straight line.

4. The cutting insert according to claim 3 wherein a clearance angle formed between an upper portion of the clearance face and the main cutting edge is smaller adjacent one end of the main cutting edge than adjacent an opposite end thereof.

5. The cutting insert according to claim 1 wherein a longitudinal plane extending through both the upper and lower faces perpendicularly to the lower face intersects the clearance face along a curved line.

6. The cutting insert according to claim 5 wherein the longitudinal plane intersects the clearance face along a convexly curved line.

7. The cutting insert according to claim 5 wherein a longitudinal plane disposed adjacent one end of the cutting edge intersects the clearance face along a curved line having a first radius; a longitudinal plane disposed adjacent an opposite end of the cutting edge intersects the clearance face along a curved line having a second radius which is 3 to 6 times longer than the first radius.

8. The cutting insert according to claim 5 wherein a clearance angle formed between an upper portion of the clearance face and the main cutting edge is constant along the main cutting edge.

9. The cutting insert according to claim 1 wherein the clearance surface extends at an inclination downwardly from the main cutting edge and toward an opposite end of the body and adjoins a lower portion of the end face and forms an obtuse angle therewith.

10. The cutting insert according to claim 9 wherein the lower portion of the end face is oriented perpendicularly to the lower face and defines a stop surface.

11. The cutting insert according to claim 10 wherein the stop surface has a height measured in a direction from the lower face to a line of intersection between the stop surface and the clearance surface, the height being from 30–70% of a height of the end face.

12. The cutting insert according to claim 11 wherein the height of the stop surface is 35–55% of the height of the end face.

13. The cutting insert according to claim 1 wherein the top face intersects the shank portion at a location opposite the main cutting edge, the shank portion including a generally concave upper keyway and a generally concave lower keyway, the upper and lower keyways extending along the length of the insert, the upper keyway being upwardly open, and the lower keyway being downwardly open.

* * * * *